(12) United States Patent
Nor et al.

(10) Patent No.: US 10,540,360 B2
(45) Date of Patent: Jan. 21, 2020

(54) IDENTIFYING RELATIONSHIP INSTANCES BETWEEN ENTITIES

(71) Applicant: Hewlett Packard Enterprise Development LP, Houston, TX (US)

(72) Inventors: Igor Nor, Haifa (IL); Sagi Schein, Haifa (IL); Omer Barkol, Haifa (IL); Eyal Hayun, Haifa (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 563 days.

(21) Appl. No.: 15/223,271

(22) Filed: Jul. 29, 2016

(65) Prior Publication Data

US 2018/0032588 A1 Feb. 1, 2018

(51) Int. Cl.
*G06F 17/30* (2006.01)
*G06F 16/2458* (2019.01)
*H04L 12/24* (2006.01)
*G06F 16/248* (2019.01)
*G06F 16/901* (2019.01)

(52) U.S. Cl.
CPC ........ *G06F 16/2477* (2019.01); *G06F 16/248* (2019.01); *G06F 16/9024* (2019.01); *H04L 41/12* (2013.01); *H04L 41/22* (2013.01)

(58) Field of Classification Search
CPC ............... G06F 16/2477; G06F 16/248; G06F 16/9024; H04L 41/12; H04L 41/22
See application file for complete search history.

(56) References Cited

U.S. PATENT DOCUMENTS

| 7,802,236 | B2 | 9/2010 | Calder et al. |
| 8,392,398 | B2 | 3/2013 | Aggarwal et al. |
| 8,595,234 | B2 | 11/2013 | Siripurapu et al. |
| 9,244,899 | B1* | 1/2016 | Greenbaum ........ G06F 16/9024 |
| 2007/0185926 | A1* | 8/2007 | Prahlad ................. G06F 16/907 |
| 2009/0018994 | A1* | 1/2009 | Hajdukiewicz ..... G06F 16/2477 |
| 2010/0131564 | A1 | 5/2010 | Pettovello |
| 2011/0252032 | A1 | 10/2011 | Fitzgerald et al. |
| 2013/0159328 | A1 | 6/2013 | McConnell |
| 2014/0052691 | A1 | 2/2014 | Sasson et al. |
| 2014/0164412 | A1 | 6/2014 | Rosenberg et al. |

(Continued)

OTHER PUBLICATIONS

Teng-Yok Lee, "Visualization and Exploration of Temporal Trend Relationships in Multivariate Time-Varying Data", Nov. 2009, IEEE, pp. 1359-1366 (Year: 2009).*

(Continued)

*Primary Examiner* — Jared M Bibbee
(74) *Attorney, Agent, or Firm* — Hewlett Packard Enterprise Patent Department

(57) ABSTRACT

A method, a computing system, and a non-transitory machine readable storage medium containing instructions for identifying relationships between entities are provided. In an example, the method includes receiving a query. The query specifies a first computing entity, a second computing entity, and a window of time. A data structure is queried based on the query to identify a set of relationship instances each corresponding to a relationship between the first computing entity and the second computing entity during the window of time. A representation of the first computing entity, the second computing entity, and the set of relationship instances is provided at a user interface.

18 Claims, 11 Drawing Sheets

(56) References Cited

U.S. PATENT DOCUMENTS

| | | | |
|---|---|---|---|
| 2014/0304233 A1* | 10/2014 | Belaunde | G06F 16/70 707/661 |
| 2014/0310260 A1 | 10/2014 | Wu et al. | |
| 2014/0330840 A1 | 11/2014 | Venkataramani et al. | |
| 2015/0026158 A1 | 1/2015 | Jin | |
| 2015/0066990 A1* | 3/2015 | Agarwal | G06F 16/9024 707/798 |

OTHER PUBLICATIONS

Chaoli Wang et al., "Analyzing Information Transfer in Time-Varying Multivariate Data", Apr. 2011, pp. 1-9 (Year: 2011).*

Arno Kolster, "Leveraging HPC and Enterprise Architectures for Large Scale Inline Transactional Analytics in Fraud Detection At Paypal", Advanced Technology Group — Site Operations Infrastructure, Sep. 19, 2012, 17 pages.

Aydin Bulug et al., "Parallel breadth-first search on distributed memory systems", Proceedings of 2011 International Conference for High Performance Computing, Networking, Storage and Analysis, Article No. 65, 2011, 12 pages.

Jacobson, G. J (1988). Succinct static data structures (Ph.D.). Pittsburgh, PA: Carnegie Mellon University.

Nanavati, et al., "Analyzing the Structure and Evolution of Massive Telecom Graphs", IEEE Trans' on Knowledge and data (20:5), pp. 703-718, 2008.

Samuels et al., "Optimal Sequential Selection of a Monotone Sequence From a Random Sample", the Annals of Probability, vol. 9, No. 6 (Dec. 1981), pp. 937-947.

\* cited by examiner

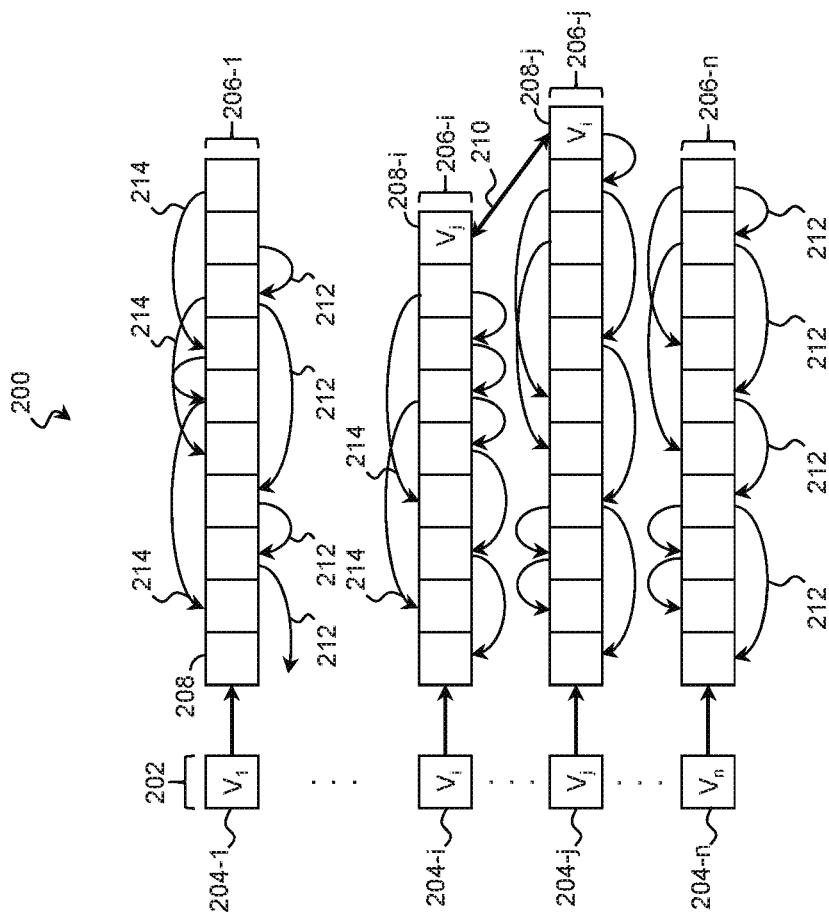

IDENTIFYING RELATIONSHIP INSTANCES BETWEEN ENTITIES

BACKGROUND

Modern businesses produce enormous quantities of data, as do a wide range of analytic, academic, and other scientific endeavors. These data sets may represent a discrete snapshot at a particular moment or may track changes over time. A wide range of analytic techniques may be used to identify relationships and correlations in these data sets, and for time-varying data, temporal analytic techniques may be applied to detect and analyze time-varying correlations.

BRIEF DESCRIPTION OF THE DRAWINGS

Certain examples are described in the following detailed description with reference to the drawings, of which:

FIGS. 2A, 2B, and 2C are schematic illustrations of a time-varying data structure according to some examples of the present disclosure.

DETAILED DESCRIPTION OF SPECIFIC EXAMPLES

Figure 1B:
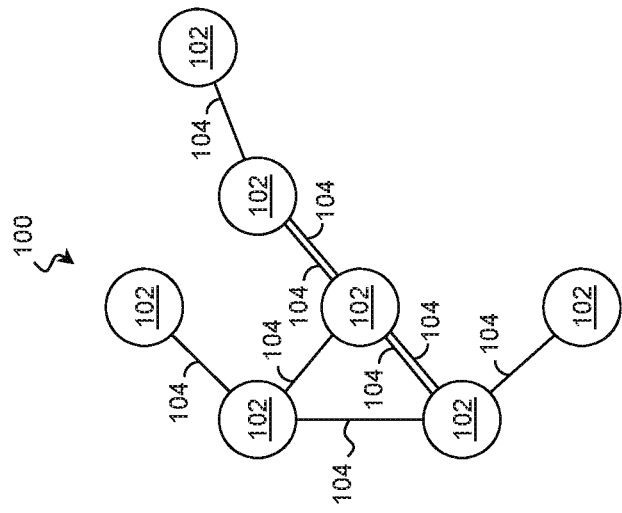
FIGS. 1A and 1B are block diagrams of an environment at a first point in time and a second point in time, respectively, according to some examples of the present disclosure.

Studying the behavior of entities, such as computers, and their relationships with their peers over time may be useful for both backward-looking analysis and forward-looking prediction. Accordingly, techniques for efficiently analyzing such relationships and presenting the results in a clear manner may be useful in a number of applications.

For example, in some security applications, certain behaviors may indicate that a computer has been compromised by malicious software or malicious users. Accordingly, a system administrator may analyze the behavior of individual computing entities to detect unusual or suspicious activity. This may indicate the origin of a threat. However, because an infection may spread from system to system across a network, once a potentially compromised entity has been identified, it may also be beneficial to determine which entities the compromised entity has been in contact with. Doing so allows the system administrator to assess the spread of the threat. In more benign examples, it may be desirable to monitor communications between computing entities to balance network load or identify potential points of failure.

Outside the realm of computers, in yet further examples, it may be desirable to monitor other relationships such as transactions between suppliers. Such activity may be analyzed to manage inventory, to detect fraud, or to predict consumer demand.

The present disclosure provides a system and technique for data analysis suitable for these applications and others. Many examples are capable of mining large databases of time-varying data to look for direct relationships as well as higher order relationships. Once the data is analyzed, the results may be presented in an easy-to-understand graphical representation.

In some examples, a time-varying data structure records communications between computing entities over a network. Communication between any number of computing entities may be monitored, and in some such examples, the data in the data structure corresponds to communications between tens of thousands of computing entities or more.

The time-varying data structure may be organized and arranged in any suitable structure, and in the example, the data structure includes an adjacency list for each computing entity. The adjacency lists record information regarding communication sessions and the other entities that are involved in the communication. Each time a communication session is detected, the adjacency list for each entity that is a party to the session is updated with information regarding the session. Because communication sessions come and go, in the example, the data structure records one or more temporal attributes (e.g., the time the session was initiated, the time the session ended, the duration of the session, etc.) in the associated entry. In this way, the data structure records both the current state of the computing entities as well as the state of the entities at various points in time.

When called upon, the data structure may be used to analyze these relationships over time. In a network security example, in the event suspicious behavior between a first computing entity and a second computing entity is detected, the data structure may be queried to determine when the first and second entities were in communication. The adjacency list for the first entity is searched within a specified window of time to retrieve those entries corresponding to the second entity that fall within the window. This produces a list of times that the first and second entities were in communication during the window.

The technique may also provide context for some of these communications. Specific instances of communication may be selected and queried to determine other entities that were in communication with the first and second computing entity at the time. As an infection may not be limited to only first order neighbors, the query may have an associated query depth to provide a more complete context. The depth determines how many times the process iterates. For each iteration, the adjacency lists for the current set of identified entities are searched to determine a further set of entities that had a relationship with any entity of the current set. In the security example, this identifies higher order communication partners and gives context for the communications between the first and second computing entities.

When the query depth has been reached and the query is complete, a graphical representation of the identified entities and their relationships may be presented to the user. In one such example, the graphical representation represents each entity as a node or vertex and represents each relationship as an edge connecting the nodes that are a party to the relationship. This provides a straightforward and intuitive way of visualizing computers communicating across a network and other types of interactions and relationships.

The system and technique of the present disclosure are structured to efficiently gather, analyze, and present relationship data between a large number of entities. By these mechanisms and others, the present disclosure provides substantial real world improvements to the analysis and presentation of time-varying data. For instance, some examples provide a compact data structure for recording relationship data that is optimized for search efficiency. Links within the data structure may decrease the overhead of searching for both first order and higher order relationships. Some examples provide a powerful and flexible technique for querying a data structure that allows a user to precisely specify those relationships to return. Some examples provide an intuitive representation of the time-varying data that allows a user to quickly recognize patterns of behavior.

These examples and others are described with reference to the following figures. Unless noted otherwise, these figures and their accompanying description are non-limiting, and no element is characteristic of any particular example. In that regard, features from one example may be freely incorporated into other examples without departing from the spirit and scope of the disclosure.

Figure 1A:
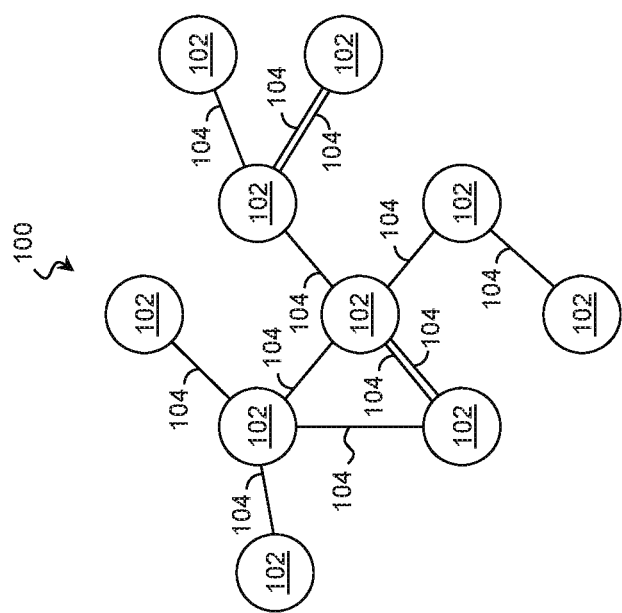
Figure 2A:
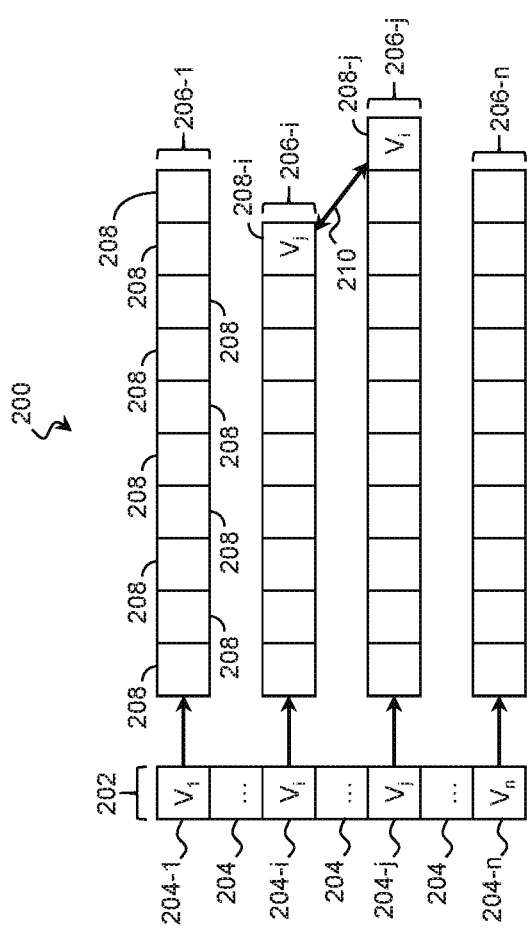
Figure 2B:
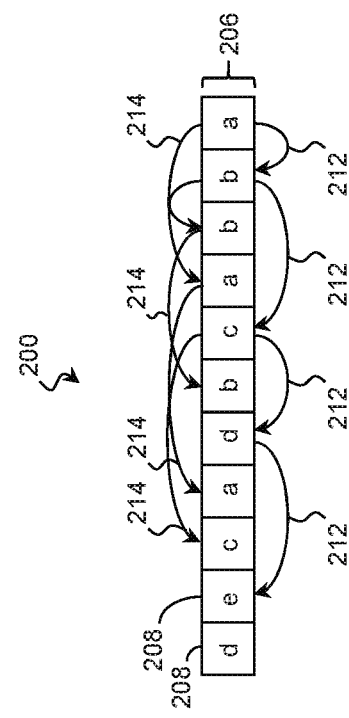

A suitable environment for practicing the technique of the present disclosure is described with reference to FIGS. 1A, 1B, 2A, 2B, and 2C. FIGS. 1A and 1B are block diagrams of an environment 100 at a first point in time and a second point in time, respectively, according to some examples of the present disclosure. FIGS. 2A, 2B, and 2C are schematic illustrations of a time-varying data structure 200 according to some examples of the present disclosure.

Referring first to FIG. 1A, the environment 100 includes a plurality of entities 102. Each entity 102 may represent any suitable element capable of having a relationship with another entity. In various examples, entities 102 include computing systems, components of computing systems, software modules, sensors, manufacturing equipment, consumer goods, vehicles, installations, etc. While each entity 102 is represented as a single object, an entity 102 may represent a homogeneous or heterogeneous group of elements of any size. In many examples, the technique is optimized to support a large number of entities 102, and accordingly, the environment 100 may include thousands of entities 102, tens of thousands of entities 102, or more.

The entities 102 may have various relationships with one another, and any property, event, or interaction between entities 102 may give rise to a relationship. For example, a relationship may exist between two or more entities 102 that are interacting (e.g., communicating) with each other. A relationship may exist when two or more entities 102 experience a particular event. A relationship may exist between two or more entities 102 that share a common property. A relationship may exist between two or more entities 102 that have corresponding properties. The specific relationships of interest may depend on the application, and this technique fully supports any suitable relationship.

In the examples of FIGS. 1A and 1B, relationship are indicated by lines 104. Each line 104 indicates a relationship between those entities 102 to which the respective line 104 is connected. In one such example, lines 104 represent communication sessions between the entities 102 over a network. As an entity 102 may have more than one concurrent relationship with another entity 102, multiple lines 104 may extend between sets of entities 102.

It is noted that interactions, properties, and other attributes that affect relationships may be dynamic and change over time. Entities are added and lost. Communication is started and stopped. Programs are launched and terminated. Accordingly, in a time-varying environment, the state of the relationships at a first point in time may differ significantly from the state of the relationships at a second point in time. In that regard, whereas FIG. 1A represents the state of the environment 100 at a first point in time, FIG. 1B represents the state of the environment 100 at a second point in time. Comparing the figures, the lines 104 that represent the state of the relationships between the entities 102 at the second point in time may be significantly different from the lines 104 at the first point in time. Similarly, different numbers and types of entities 102 may be present in the environment 100 at the second time.

Referring next to FIG. 2A, illustrated is a time-varying data structure 200 suitable for recording relationship data of the entities 102 over time. The time-varying data structure 200 may represent each entity 102 as a vertex recorded in a vertex list 202. The elements 204 of the vertex list 202 may record identifiers of their corresponding entities 102 and may be structured in a linked list, an array, or other suitable data structure. In an example, element 204-1 records an identifier of a first entity 102, represented as $V_1$. Element 204-$i$ records an identifier of another entity 102, represented as $V_i$. Element 204-$j$ records an identifier of another entity 102, represented as $V_j$. Element 204-$n$ records an identifier of another entity 102, represented as $V_n$. The vertex list 202 may include any number of elements 204 corresponding to any number of entities 102, and the number of entities 102 recorded in the vertex list 202 may change over time.

Each vertex (and thus each entity 102) may have an associated adjacency list 206, of which adjacency lists 206-1, 206-$i$, 206-$j$, and 206-$n$ are examples. The adjacency lists 206 may be structured as a linked list, an array, or other suitable data structure. For clarity, some of the adjacency lists 206 have been omitted. Of the illustrated adjacency lists, adjacency list 206-1 corresponds to the entity 102 represented as $V_1$. Adjacency list 206-$i$ corresponds to the entity 102 represented as $V_i$. Adjacency list 206-$j$ corresponds to the entity 102 represented as $V_j$. Adjacency list 206-$n$ corresponds to the entity 102 represented as $V_n$.

The adjacency lists 206 include entries 208 that record relationship data for relationships between the associated entity and another entity. In various examples where the relationships pertain to communication sessions between entities 102, an entry 208 in an adjacency list 206 records at least one of: a timestamp associated with a request or response, a network identifier such as a Media Access Control (MAC) address, a protocol identifier, a protocol version, a transaction identifier, a Domain Name Service flag, a nameserver identifier, and/or other relevant data.

Additionally or in the alternative, each entry 208 may record one or more temporal attributes (e.g., a timestamp, a start time, an end time, a duration, etc.) that represent a time associated with the respective relationships. Entries 208 of the adjacency lists 206 may be stored in order according to the temporal attribute. In the example of FIG. 2A, elements are added to the right-hand side of the adjacency lists 206, and within an adjacency list 206, an element to the right represents a newer relationship than an element to the left.

In the illustrated example, entry 208-$j$ records relationship data for a relationship between elements $V_i$ and $V_j$, and entry 208-$i$ records relationship data for a relationship between elements $V_j$ and $V_i$. In that regard, these particular entries record data from the same relationship from different perspectives. For entries that refer to the same relationship, the data structure 200 may include a neighbor pointer 210 that stores memory locations corresponding to the two or more entries 208 of the relationship. This allows the adjacency lists 206 to be traversed more efficiently because once one of the entries 208 that corresponds to a relationship has been located, the corresponding entry or entries in the other adjacency list(s) can be quickly located using the neighbor pointer 210.

FIG. 2B shows an example of an adjacency list 206 in further detail. The entries of the adjacency list 206 record information pertaining to relationships between a first entity 102 and various other entities 102 referred to by the characters "a", "b", "c", "d", and "e". Because multiple relationships may exist between the first entity 102 and the other entities 102, each of the other entities 102 may appear multiple times in the adjacency list 206. These may represent different discrete relationships (e.g., different communication sessions) or a single relationship at different points in time.

In some applications, it may be beneficial to ignore multiple entries that redundantly refer the same entity 102 and to identify only unique occurrences. For this purpose and others, the data structure 200 may include a skip chain 212 for the adjacency list 206. For each entity 102, the skip chain 212 points to a single entry in the adjacency list 206. In other words, entries 208 with the same set of entities 102 are skipped. In the illustrated example, the skip chain 212 includes the most recent occurrence of a relationship with a particular entity 102, although in other examples, it includes the oldest occurrence of a relationship with a particular entity 102. The skip chain 212 may be structured as a chain of pointers, a set of links, a hash table, or other suitable data structure.

In some applications, it may be beneficial to locate the previous instance of a relationship with a particular entity 102. For this purpose and others, the data structure may include a previous instance pointer 214 for the adjacency list 206. The previous instance pointer 214 may point backwards or forwards in time to another entry 208 in the adjacency lists 206 that represents a relationship with the same entity 102. For example, the previous instance pointer 214 may point to the last time that the relationship existed with the entity. The previous instance pointers 214 may be structured as sets of pointers, sets of links, hash tables, or other suitable data structure. FIG. 2C is substantially similar to FIG. 2A with the addition of skip chains 212 and previous instance pointers 214 to the adjacency lists 206.

Figure 3:
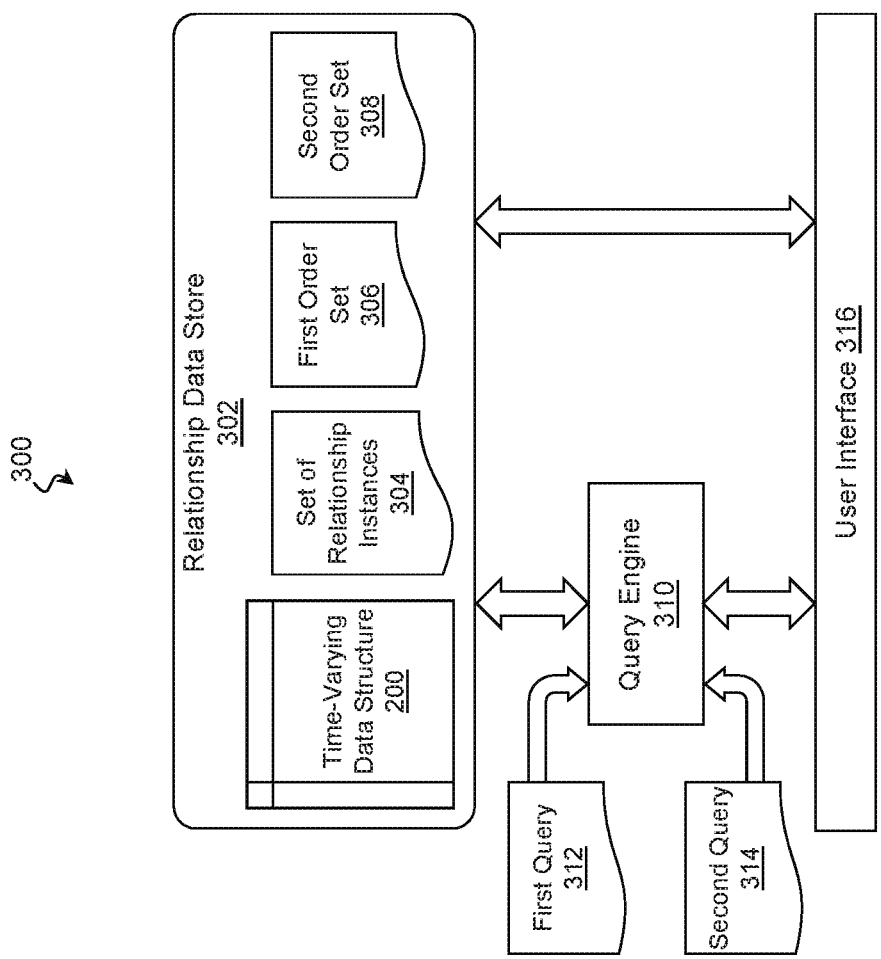
FIG. 3 is a block diagram of a computing system for analyzing and presenting time-varying relationship data according to some examples of the present disclosure.

A system suitable for storing and analyzing the time-varying data structure 200 is disclosed with reference to FIG. 3. In that regard, FIG. 3 is a block diagram of a computing system 300 for analyzing and presenting time-varying relationship data according to some examples of the present disclosure.

The computing system 300 may include a relationship data store 302, which in turn, may include an aggregation of any number, capacity, and type of memory devices. Suitable memory devices include Solid State Drives (SSDs), Hard Disk Drives (HDDs), optical media, cache memory devices, Random Access Memory (RAM), battery-backed RAM, and/or other memory devices suitable for storing data. The memory devices of the relationship data store 302 may store a time-varying data structure 200 that records relationships between entities 102 as described above. In that regard, the entities 102 may represent any suitable element(s) capable of having a relationship with another element. In some examples, the entities 102 represent computing systems, and the particular relationships pertain to communication sessions between the entities 102. The time-varying data structure 200 may be stored on the memory devices any suitable form such as that of FIGS. 2A, 2B, and/or 2C. In further examples, the time-varying data structure 200 is stored in the form of one or more lists, arrays, data trees, hashes, flat files, and/or graphs.

The relationship data store 302 may also store a set of relationship instances 304 that records specific instances of a relationship between two or more entities 102 at various points in time. A technique for obtaining the set of relationship instances 304 from the time-varying data structure 200 is described in detail below. The relationship data store 302 may also store higher order sets of relationship instances (e.g., first order set 306, second order set 308, etc.). The higher order sets may store information regarding those entities 102 having a relationship with an entity in a lower order set in order to trace a chain of relationships through a number of hops. For example, the first order set 306 may record entities 102 with a direct relationship to the entities 102 of the set of relationship instances 304 (i.e., the zeroth order set); the second order set 308 may record entities 102 with a direct relationship to the entities 102 of the first order set 306; and so on. A technique for populating the higher order sets is also described in detail below.

The relationship data store 302 may be communicatively coupled to a query engine 310 that is operable to receive queries directed to the time-varying data structure 200 that request data about relationships between specified entities 102. For example, the query engine 310 may be operable to receive a first query 312 that specifies a first entity, a second entity, and/or a first window of time. In response to the first query 312, the query engine 310 may obtain, from the time-varying data structure 200, a set of relationship instances 304 that records specific instances of relationships between the first entity and the second entity during the first window of time.

In another example, the query engine 310 may be operable to receive a second query 314 that specifies a particular relationship from the set of relationship instances 304. In response to the second query 314, the query engine 310 may obtain, from the time varying data structure 200, a first order set 306 that records entities 102 with a direct relationship to either the first entity or the second entity during another window of time. Based on a depth of the second query 314, the query engine 310 may also obtain, from the time varying data structure 200, a second order set 308 that records entities 102 with a direct relationship to the entities of the first order set 306. The query engine 310 may provide these sets to a user interface 316 for display.

The user interface 316 of the computing system 300 is operable to receive the set of relationship instances 304, the first order set 306, the second order set 308, and/or higher order sets of relationship instances from the query engine 310 and/or the relationship data store 302 and to display a representation of this data to a user. Accordingly, the user interface 316 may be operable to provide output to a user by way of any number of output devices including a monitor or other graphical display, a printer, a speaker, a haptic feedback device, etc. In various examples, the user interface 316 provides a representation of the entities 102 and their relationships recorded in the set of relationship instances 304, the first order set 306, the second order set 308, and/or other higher order sets of relationship instances by any suitable modality including graphically via a monitor or other display device. The user interface 316 may also be operable to receive user input from any number of user input devices such as a mouse, a keyboard, a touchscreen, a haptic input device, a microphone, etc.

Figure 4:
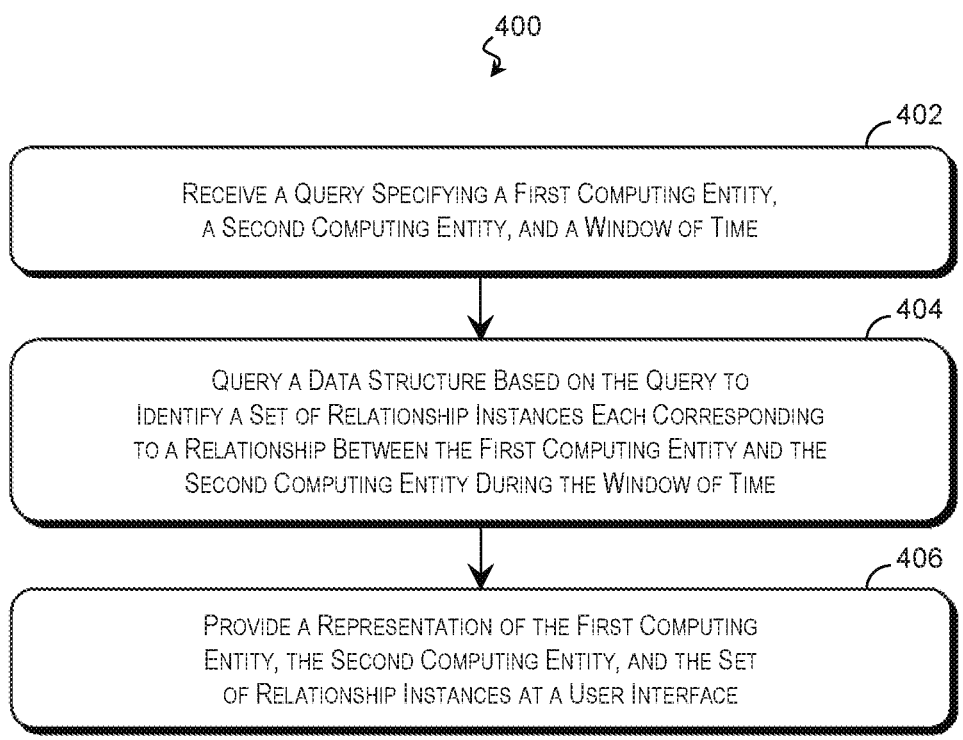
FIG. 4 is a flow diagram of a method of analyzing a time-varying data structure according to some examples of the present disclosure.

A technique for analyzing time-varying relationship data is described with reference to FIG. 4. The relationship data may pertain to any number and type of entity (e.g., entities 102 of FIG. 1) and any suitable relationship therebetween, and the technique is suitable for performing using any suitable system including the computing system 300 of FIG. 3. In that regard, FIG. 4 is a flow diagram of a method 400 of analyzing the time-varying data structure 200 according to some examples of the present disclosure. The description of method 400 is non-limiting, and steps may be added to and omitted from the method 400 without departing from the disclosure. Furthermore, unless noted otherwise, processes of the method 400 may be performed in any order including being performed concurrently by one or more entities.

Referring first to block 402 of FIG. 4, a processing resource of a computing system (e.g., the computing system 300 of FIG. 3) receives a query requesting relationship information regarding relationships between a first computing entity 102 and a second computing entity 102. The query may be substantially similar to the first query 312 of FIG. 3 and may specify the computing entities directly, by group name, by reference to an entity list, or by any other suitable indicator. As noted above, in a time-varying environment, the state of the relationships at a first point in time may differ significantly from the state of the relationships at a second point in time. Accordingly, the query may also specify a window of time that allows the querent to focus the request on a particular interval. The query may specify the window by reference to a start time, an end time, a center point, a duration, and/or other temporal specifiers. In various examples, the query is silent regarding the first computing entity, the second computing entity, and/or the window of time, and default values are used.

Referring to block 404 of FIG. 4, a query engine 310 or other suitable processing resource queries a data structure such as the time-varying data structure 200 of FIGS. 2A, 2B, and/or 2C based on the query to identify instances of relationships between the first computing entity and the second computing entity occurring within the window of time. In an example, the time-varying data structure 200 is searched by identifying an adjacency list 206 associated with the first computing entity 102. The adjacency list 206 is traversed to identify the first entry 208 that falls within the window of time. This entry 208 is checked to determine whether it corresponds to a relationship between the first computing entity and the second computing entity. If not, the next entry 208 in the adjacency list 206 is checked to determine whether it both falls with the window of time and corresponds to a relationship between the first computing entity and the second computing entity. If an entry is within the window and corresponds to such a relationship, information regarding the relationship may be added to a set of relationship instances 304.

When the entries 208 in the adjacency list 206 that fall within the window of time have been exhausted, the set of relationship instances 304 includes those relationship instances that occurred during the window of time. The set of relationship instances 304 may include any number of relationship instances (including zero) based on the results of block 404. A user interface 316 or other suitable resource may provide a user with a representation of the first computing entity, the second computing entity, and/or the set of relationships as shown in block 406, and the representation may take any form, examples of which are provided below.

Figure 5:
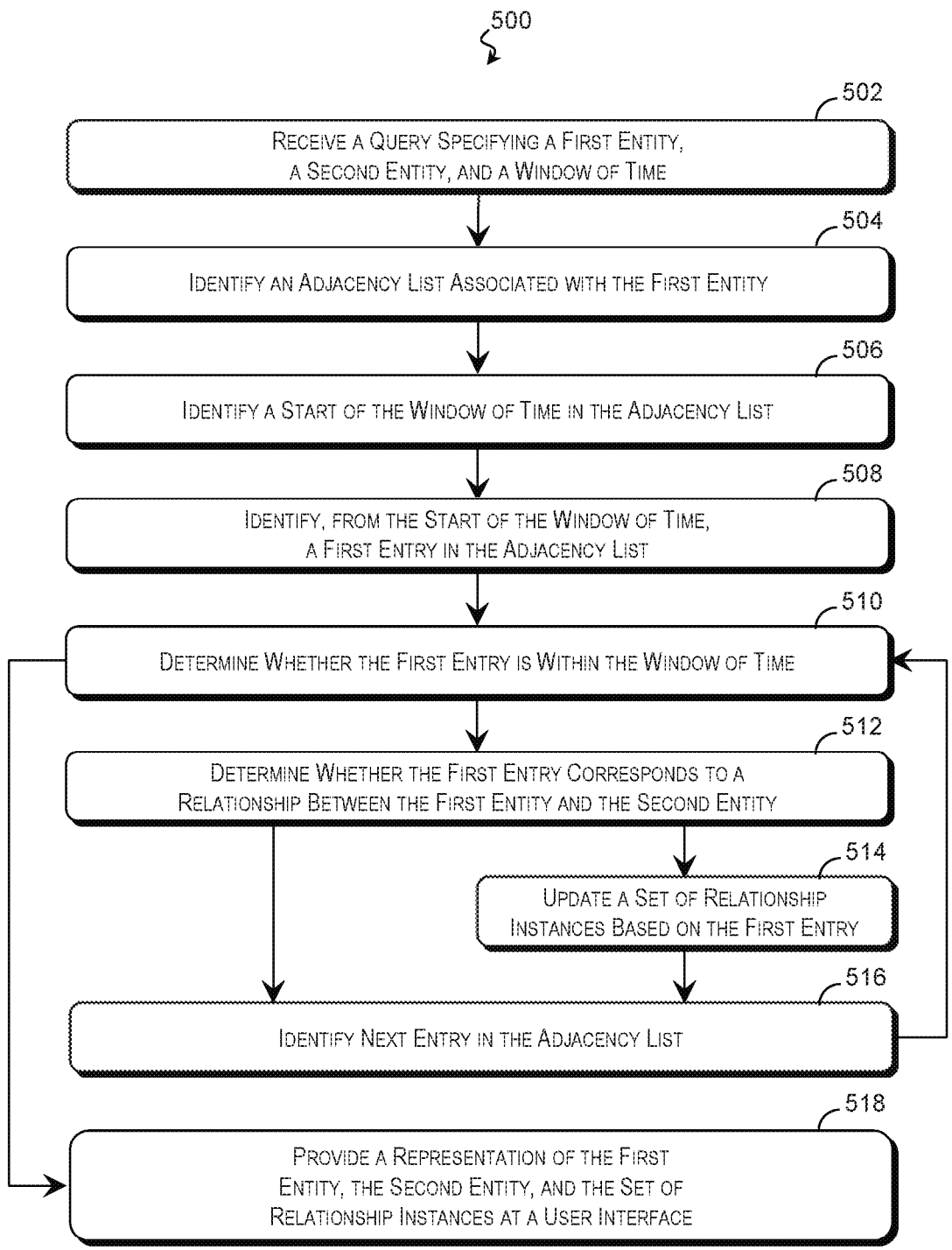
FIG. 5 is a flow diagram of a method of identifying relationship information using a time-varying data structure according to some examples of the present disclosure.

Further examples of the technique for analyzing time-varying relationship data is described with reference to FIG. 5. FIG. 5 is a flow diagram of a method 500 of identifying relationship information using a time-varying data structure 200 according to some examples of the present disclosure. The description of method 500 is non-limiting, and steps may be added to and omitted from the method 500 without departing from the disclosure. Furthermore, unless noted otherwise, processes of the method 500 may be performed in any order including being performed concurrently by one or more entities. The method 500 is suitable for being performed by any suitable computing system including the computing system 300 of FIG. 3.

Referring first to block 502 of FIG. 5, a processing resource of the computing system 300 or other computing resource receives a query for relationship information, which may be substantially as described in block 402 of FIG. 4. As with previous examples, the relationship data may pertain to any number and type of entity (e.g., entities 102 of FIG. 1) and any suitable relationship therebetween. The query may specify a first entity 102, a second entity 102, and/or a window of time. Default values may be used for any parameter that is not specified by the query.

A query engine 310 or other suitable processing resource may search a relationship data structure such as the time-varying data structure 200 of FIGS. 2A, 2B, and/or 2C based on the query. The particular processes used to query the relationship data structure may depend in part on the form the data structure takes. In an example using the time-varying data structure 200 of FIGS. 2A, 2B, and/or 2C, the query engine 310 identifies an adjacency list 206 associated with the first entity 102 in block 504.

Referring to block 506, the query engine 310 may search the entries 208 of the adjacency list 206 in order to locate the start of the window within the adjacency list 206. This may be performed using a binary search or other search technique. A binary search may divide the entries of the adjacency list 206 roughly in half and compare a temporal property at the boundary between the two halves to the start time to determine which half contains the start time. Whichever half is identified is again divided in half and a temporal property at the boundary is compared to the start time. This may be repeated until the start time is identified. A binary search is desirable in some applications because the worst-case performance is on the order of O(log n).

Referring to block 508, the query engine 310 may use the start of the window to identify a first entry of the adjacency list 206 for analysis. Referring to block 510, the first entry of the adjacency list 206 may be checked to determine whether it occurs within the window of time by comparing a time associated with the first entry with an end of the window. If the first entry is within the window of time, the query engine 310 determines whether the first entry corresponds to a relationship between the first entity and the second entity in block 512. If so, the first entry may be used to update a set of relationship instances 304 in block 514.

The query engine 310 may repeat the process of blocks 510-514 for each subsequent entry in the adjacency list 206 until the end of the window of time is reached. Before each iteration, referring to block 516, the query engine 310 may identify the next entry 208 of the adjacency list 206 for analysis. In some examples, the next entry 208 is the entry in the adjacency list that immediately follows the last entry analyzed in blocks 510-514. However, if the last entry 208 analyzed corresponds to the second entity and the adjacency list 206 includes previous instance pointers 214, a previous instance pointer 214 may be used to identify the next entry for analysis. The previous instance pointer 214 may greatly reduce the number of entries 208 analyzed by jumping straight to those entries 208 that correspond to the second entity after the first such entry is located. Alternatively, if the last entry analyzed does not correspond to the second entity 102 and the adjacency list includes a skip chain 212, the skip chain 212 may be used to jump over repeating entries 208. Because the skip chain 212 skips over entries 208 of relationships that involve the same set of entities 102, the skip chain 212 may point to the next entry 208 with a unique entity 102. Thus, following the skip chain 212 may reduce the number of entries 208 analyzed in the method 500.

Once the next entry 208 in the adjacency lists 206 has been identified, the method 500 may proceed to block 510, where the query engine 310 may analyze the next entry 208 to determine whether it occurs within the window of time substantially as described above. If so, the method proceeds to block 512, where the query engine 310 determines whether the entry corresponds to a relationship between the first entity and the second entity. However, if it is determined in block 510 that the entry is after the end of the window of time, the method may proceed to block 518, where a user interface 316 may provide a representation of the first entity, the second entity, and/or the set of relationship instances 304 to a user. This may be performed substantially as described in block 406 of FIG. 4. The set of relationships may include any number of relationship instances (including zero) based on the results of block 404, and the representation may take any form.

The technique of the present disclosure may also provide context for the relationships identified in method 400 and/or 500. For example, when analyzing communications between two entities 102, it may be useful to view other entities 102 that they were also in communication with. Thus, the context may include other entities 102 that had a relationship with those entities specified in the query of blocks 402 and 502.

Figure 6:
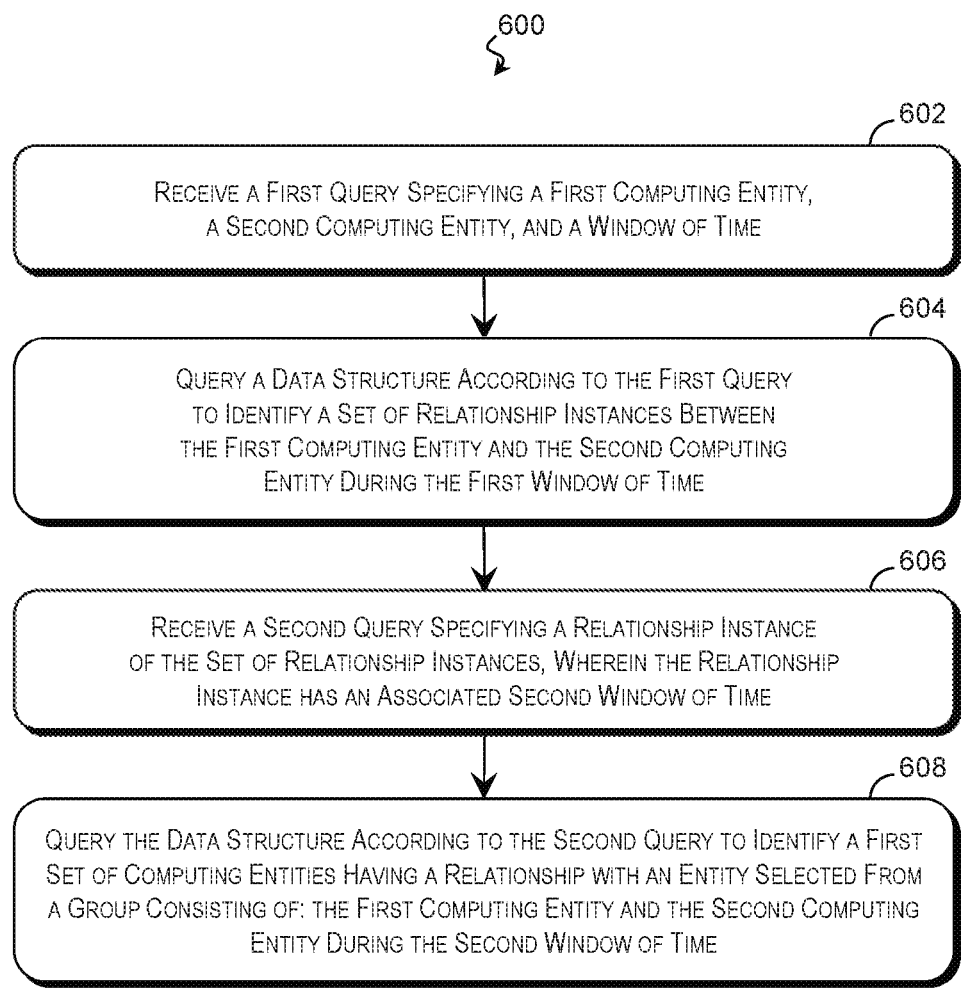
FIG. 6 is a flow diagram of a method of providing relationship information and context according to some examples of the present disclosure.

Examples of a method for determining relationship information and its context are described with reference to FIG. 6. FIG. 6 is a flow diagram of a method 600 of providing relationship information and context according to some examples of the present disclosure. The description of method 600 is non-limiting, and steps may be added to and omitted from the method 600 without departing from the disclosure. Furthermore, unless noted otherwise, processes of the method 600 may be performed in any order including being performed concurrently by one or more entities. The method 600 is suitable for being performed by any suitable computing system including the computing system 300 of FIG. 3.

Referring to block 602 of FIG. 6, a processing resource of a computing system (e.g., the computing system 300 of FIG. 3) receives a first query 312 requesting relationship information regarding relationships between a first computing entity 102 and a second computing entity 102 within a window of time. This may be performed substantially as described in blocks 402 of FIG. 4 and/or 502 of FIG. 5, and the first query 312 may specify the computing entities 102 directly, by group name, by reference to an entity list, or by any other suitable indicator. In various examples, the first query 312 is silent regarding the first computing entity, the second computing entity, and/or the window of time, and default values are used.

Referring to block 604 of FIG. 6, a query engine 310 or other processing resource queries a data structure such as the time-varying data structure 200 of FIGS. 2A, 2B, and/or 2C according to the first query 312 to identify a set of relationship instances between the first computing entity and the second computing entity during the first window of time. This may be performed substantially as described in block 404 of FIG. 4 and/or blocks 504-516 of FIG. 5.

Referring to block 606 of FIG. 6, the processing resource of the computing system receives a second query 314 (e.g., second query 314 of FIG. 3) that specifies a relationship instance from the set of relationship instances for further analysis and context. In some examples, the set of relationship instances 304 are arranged along a timeline and presented to a user via a user interface 316. As the user traverses the timeline, queries are generated to provide context for the associated instances. The second query 314 may specify a second window of time around the relationship instance or a default value may be used. This second window of time may be independent of the first window of time. For example, the first query 312 may request relationship instances within an hour-long span of time, while the second query 314 may request higher-order relationships occurring within 5 seconds of the specified relationship instance. In another example, the second query 314 requests relationships that are concurrent with the specified relationship instance.

Referring to block 608, the query engine 310 or other suitable computing resource queries the data structure to identify a set of computing entities that had a relationship with the first computing entity 102 and the second computing entity 102 during the second window of time. In some examples, the time-varying data structure 200 of FIGS. 2A, 2B, and/or 2C is queried by identifying an adjacency list 206 associated with the first computing entity 102. The adjacency list 206 is traversed to identify the first entry 208 that falls within the second window of time. The query engine 310 updates a first order set 306 based on the entry to include relationships information such as an identifier of the entity 102 having the relationship with the first computing entity 102, information regarding the relationship, and/or other suitable information. This may be repeated for subsequent entries 208 in the adjacency list 206 until the end of the second window of time is reached. To determine those relationships with the second computing entity 102, the process may be repeated on an adjacency list 206 associated with the second computing entity 102. This populates the first order set 306 with those direct relationships with the first computing entity and/or the second computing entity that occurred during the second window.

In some applications, it may be desirable to look deeper into the chain of relationships. Accordingly, the second query 314 may specify a depth for the context. This may allow the user to follow the chain of relationships to the specified depth (i.e., number of hops). In a computer security example, this chain of relationships may be useful to determine other systems that may be compromised.

Figure 7A:
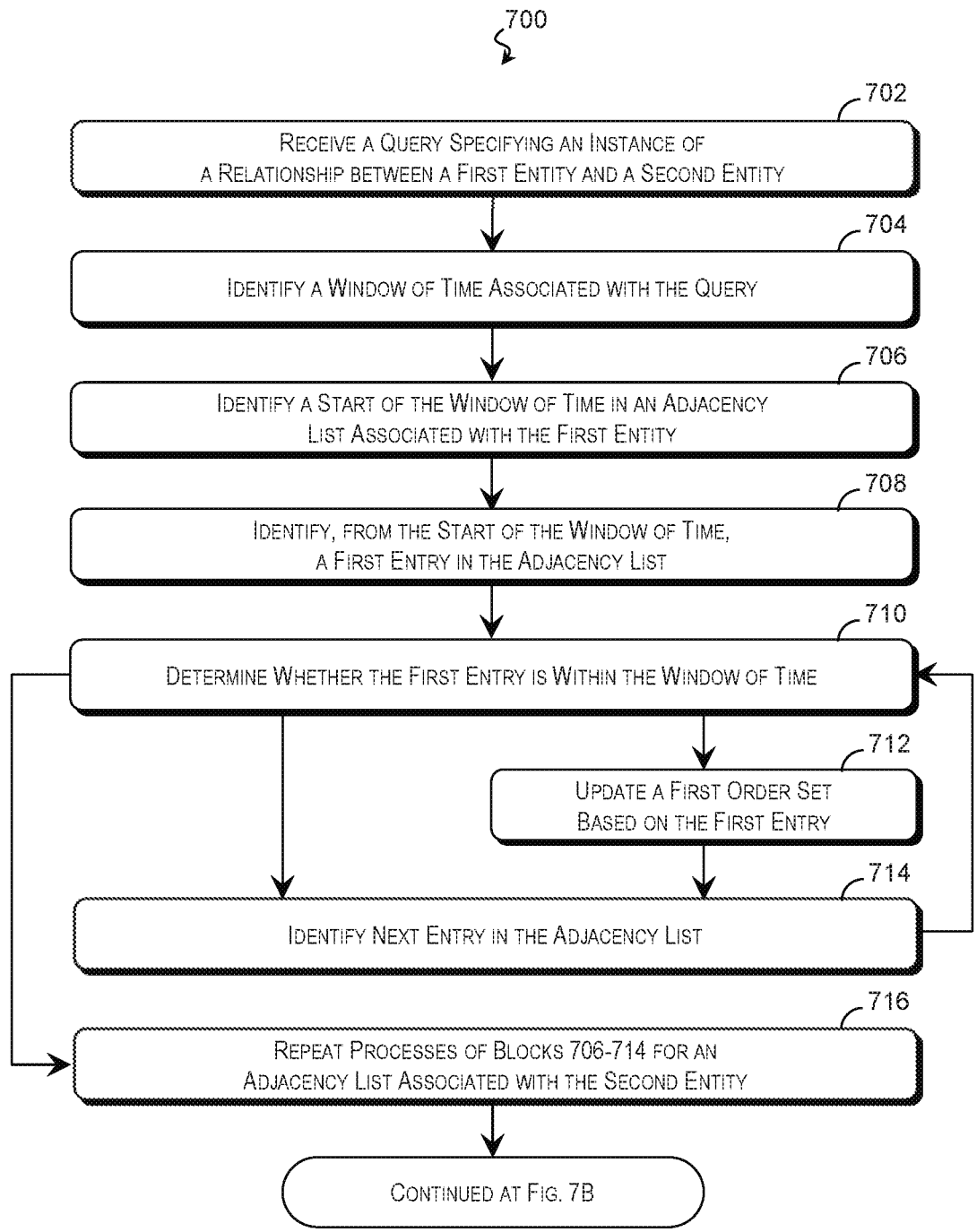
FIGS. 7A and 7B are flow diagrams of a method of providing relationship context to a particular depth according to some examples of the present disclosure.
Figure 7B:
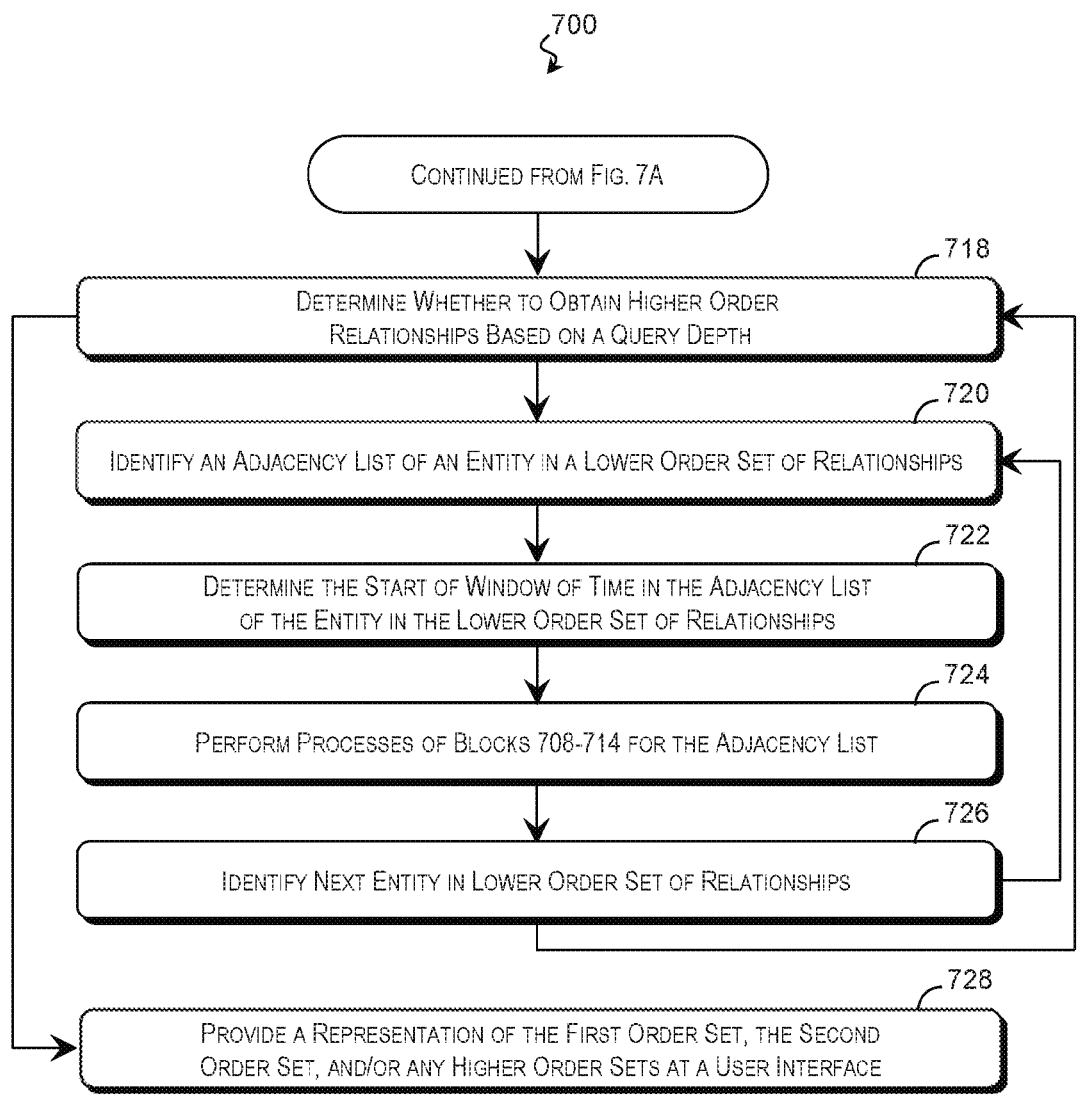

Examples of a method for determining a deeper context are described with reference to FIGS. 7A and 7B. FIGS. 7A and 7B are flow diagrams of a method 700 of providing relationship context to a particular depth according to some examples of the present disclosure. The description of method 700 is non-limiting, and steps may be added to and omitted from the method 700 without departing from the disclosure. Furthermore, unless noted otherwise, processes of the method 700 may be performed in any order including being performed concurrently by one or more entities. The method 700 is suitable for being performed by any suitable computing system including the computing system 300 of FIG. 3.

Referring to block 702 of FIG. 7A, a processing resource of the computing system 300 or other computing resource receives a query (e.g., second query 314 of FIG. 3) that specifies an instance of a relationship between a first entity 102 and a second entity 102. This may be performed substantially as described in block 606 of FIG. 6, and the relationship instance may be one of the instances in the set of relationship instances 304 compiled in block 404 of FIG. 4, blocks 504-516 of FIG. 5, and/or block 604 of FIG. 6. The query may also specify a query depth and/or a unique flag that specifies whether to return a single relationship when multiple concurrent relationships exist. These values may be specified by the query or default values may be used.

Referring to block 704, a query engine 310 or other suitable processing resource identifies a window of time for the query and the associated the relationship instance. The window of time may be specified by the query by reference to a start time, an end time, a center point, a duration, and/or other temporal specifiers or a default value may be used.

Referring to block 706, the query engine 310 or other suitable computing resource identifies the start of the window of time within the adjacency list 206 associated with the first entity 102. Referring to block 708, the query engine 310 may use the start to identify a first entry of the adjacency list 206 for analysis. The first entry of the adjacency list 206 is checked in block 710 to determine whether it occurs within the window of time by comparing a time associated with the first entry with an end of the window. The process of blocks 706-710 of FIG. 7A may be performed substantially as described in blocks 506-510 of FIG. 5.

If the first entry is within the window of time, the query engine 310 updates a first order set 306 based on the entry as shown in block 712 of FIG. 7A. The first order set 306 may record an identifier of the entity 102 having the relationship with the first entity 102, information regarding the relationship, and/or other suitable information.

Referring to block 714, the query engine 310 may identify the next entry 208 of the adjacency list 206 for analysis. In some examples, the next entry 208 is the entry 208 that immediately follows the last entry 208 analyzed in blocks 710-712. However, it is noted that two entities 102 may have multiple relationships within the time window. For example, a computer may have multiple concurrent communication sessions with another computer. In some applications, it may be useful to identify each communication sessions, while in other applications, this information is redundant. If the query requests that repetitive relationships be omitted and the adjacency list 206 includes a skip chain 212, the skip chain 212 may be used to identify the next entry for analysis. The skip chain 212 skips over entries 208 with the same set of entities 102 and points to entries 208 with unique combinations of entities 102. Accordingly, using the skip chain 212 allows the query engine 310 to quickly jump to the next entry 208 with a unique relationship and set of entities 102.

The method 700 may proceed to block 710, where the query engine 310 may analyze the next entry to determine whether it occurs within the window of time substantially as described above. If so, the method proceeds to block 712, where the query engine 310 updates the first order set 306 based on the entry and determines the next entry in block 714. In the alternative, if it is determined in block 710 that the entry is after the end of the window of time, then the first order set 306 already contains information regarding all of the relationships with the first entity 102 within the time window (if any). The method may then proceed to block 716, where the processes of blocks 706-714 are repeated for an adjacency list 206 associated with the second entity 102.

When the first order set 306 has been populated with the direct relationships with the first entity and/or the second entity, the method may proceed to block 718 of FIG. 7B, where the query engine 310 determines whether to continue to obtain higher order relationships based on a depth associated with the query. If the query depth specifies a higher order relationship, the query engine 310 or other computing resource may identify direct relationships with the entities 102 identified in the last iteration of blocks 706-716. To do so, in block 720, the query engine 310 identifies an adjacency list 206 associated with an entity 102 in the lower order set compiled in the previous iteration of blocks 706-716. In an example, the query engine 310 identifies second order relationships using an adjacency list 206 of an entity 102 in the first order set 306.

Referring to block 722, the query engine 310 may determine the start of the window of time in the adjacency list 206 associated with the lower order set. This may be performed substantially as described in block 706. Additionally or in the alternative, a neighbor pointer 210 that correlates entries 208 between adjacency lists 206 may be used to identify the window of time in the adjacency list 206. A neighbor pointer 210 of an entry 208 that falls within the window of time will point to a corresponding entry 208 in another adjacency list 206 that also falls within the window of time. For example, a neighbor pointer 210 of an entry 208 in the adjacency list 206 of the first entity 102 that falls within the window will point to a corresponding entry 208 in an adjacency lists 206 of an entity 102 in the first order set 306 that also falls within the window. Accordingly, when the window of time is located in a lower order adjacency list 206, the neighbor pointers 210 may be followed to locate the window of time within adjacency lists 206 used to populate the higher order set. In this way, the neighbor pointers 210 may avoid the overhead associated with a binary search to locate the window.

Once the window of time has been located, the query engine may identify entries of the adjacency list 206 for analysis and determine whether to update a higher order set (e.g., second order set 308) based on the entries. As shown in block 724, this may be performed substantially as described in blocks 708-714. Referring to block 726, if additional entities 102 exist in the lower order set, another entity 102 is selected from the set for analysis, and the method returns to block 720. When the last entity 102 in the lower order set has been analyzed, the method may proceed from block 726 to block 718, where the query engine 310 or other suitable computing resource determines whether to continue to obtain higher order relationships based on the query depth.

When the query depth has been satisfied, the method may proceed to block 728, where a user interface 316 may provide a representation of the first order set 306, the second order set 308, and/or any higher order sets to a user. The representation may take any form, and this may be performed substantially as described in block 406 of FIG. 4 and/or block 518 of FIG. 5.

Figure 8:
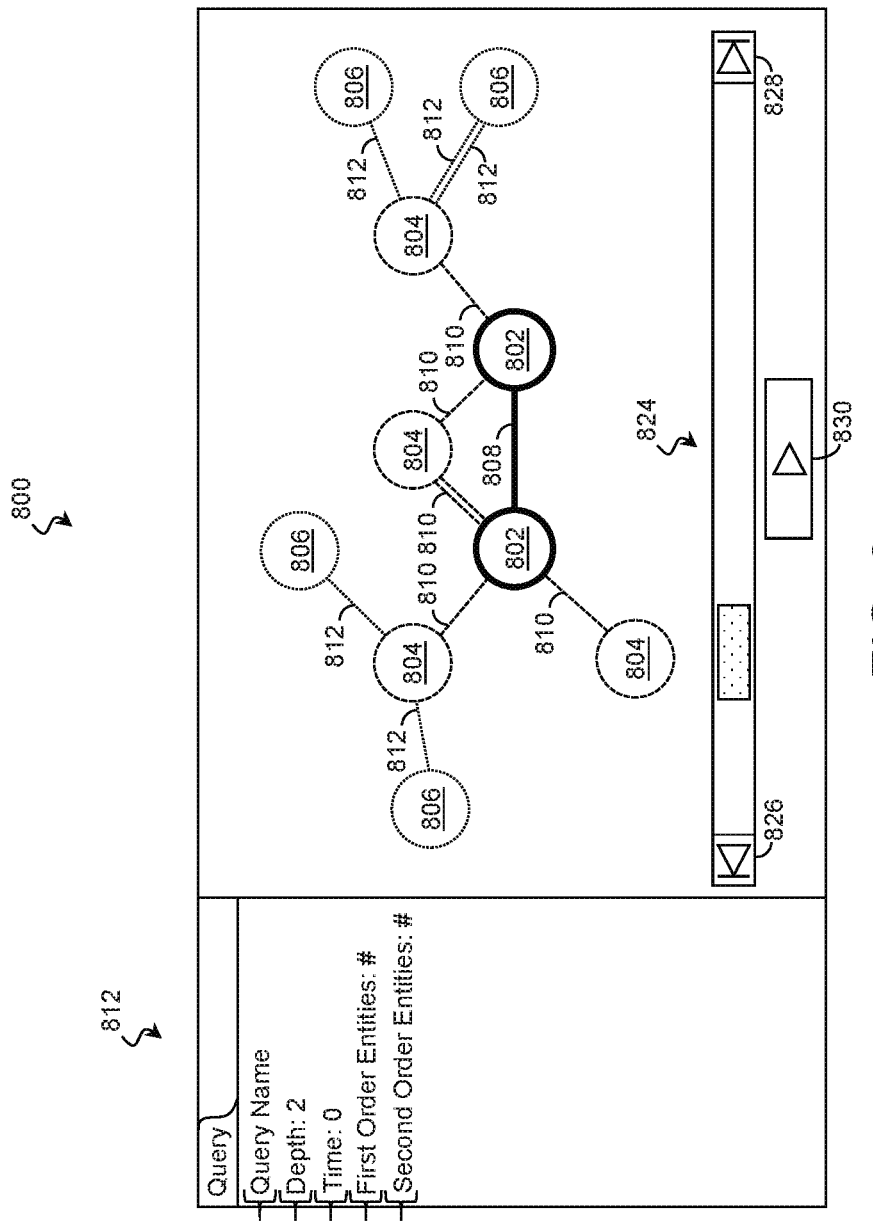
FIG. 8 is a schematic representation of a Graphical User Interface (GUI) displaying a representation of a set of entities and their relationships according to some examples of the present disclosure.

FIG. 8 is a schematic representation of a Graphical User Interface (GUI) 800 displaying a representation of a set of entities 102 and their relationships according to some examples of the present disclosure. The GUI 800 may be presented by a user interface 316 of FIG. 3 or other computing resource. The GUI 800 may represent entities 102 (including the first computing entity 102 and the second computing entity 102 specified by the query, the entities 102 of the first order set 306, the entities 102 of the second order set 308, and/or any entities 102 of any higher order sets) and relationships using any suitable representation. In some examples, the GUI 800 represents each entity as a node or vertex and represents each relationship as an edge connecting the nodes that are a party to the relationship. In some such examples, different markers represent different types of entity 102. For example, a first type of marker 802 may be used to represent the first and second entities 102 specified by the query. A second type of marker 804 may be used to represent any entities having a first order relationship with the specified entities 102 (e.g., the entities 102 of the first order set 306). A third type of marker 806 may be used to represent any entities having a second order relationship with the specified entities 102 (e.g., the entities 102 of the second order set 308).

The GUI 800 may also represent relationships between the entities 102 using an indicator such as a line between the respective entities. Different line attributes such as weight, shape, or line continuity may indicate different types of relationships. For example, a first type of line 808 may be used to represent zeroth order relationships, a second type of line 810 may be used to represent first order relationships, and a third type of line 812 may be used to represent second order relationships.

The GUI 800 may include one or more information panes 812 that display any combination of textual and graphical information regarding the query or the entities. In an example, the information pane 812 displays a query identifier 814 such as a title or alias for the query, query depth indicator 816, a time window indicator 818, a first order count 820 that indicates a count of entities with a first order relationship with the specified entities, a second order count 822 that indicates a count of entities with a second order relationship with the specified entities, and/or any other suitable information.

The GUI 800 may include time controls 824 that are operable to modify the time period displayed by the GUI 800. The time controls 824 may include buttons 826 and 828 to increment and decrement the currently displayed time, respectively, as well as a button 830 to control an animated presentation of the relationships that automatically moves through the time window of time. As the animated presentation is played, markers representing entities and lines representing relationships may appear and disappear and the information pane(s) 812 may be updated accordingly. Of course, GUI 800 represents only some examples of a suitable modality by which the results of the query may be presented.

Figure 9:
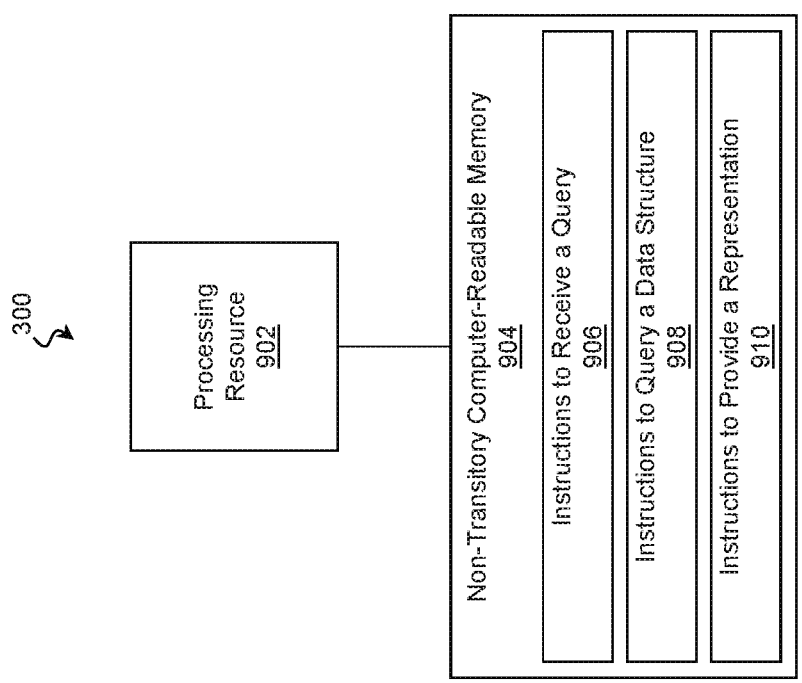
FIG. 9 is a block diagram of a computing system including a non-transitory computer-readable memory resource according to some examples of the present disclosure.

The processes of methods 400, 500, 600, and 700 may be performed by any combination of hard-coded and programmable logic. In some examples, a processing resource utilizes instructions stored on a non-transitory computer-readable memory resource to perform at least some of these processes. Accordingly, examples of the present disclosure may take the form of a non-transitory computer-readable memory resource storing instructions that perform at least part of methods 400, 500, 600, and 700. FIG. 9 is a block diagram of a computing system 300 including a non-transitory computer-readable memory resource according to some examples of the present disclosure. The computing system 300 may be substantially similar to that of FIG. 3.

The computing system 300 may include one or more processing resources 902 operable to perform any combination of the functions described above. The illustrated processing resource 902 may include any number and combination of Central Processing Units (CPUs), Graphics Processing Units (GPUs), microcontrollers, Application-Specific Integrated Circuits (ASICs), Field-Programmable Gate Arrays (FPGAs), and/or other processing resources.

To control the processing resource 902, the computing system 300 may include a non-transitory computer-readable memory resource 904 that is operable to store instructions for execution by the processing resource 902. The non-transitory computer-readable memory resource 904 may include any number of non-transitory memory devices including battery-backed RAM, SSDs, HDDs, optical media, and/or other memory devices suitable for storing instructions. The non-transitory computer-readable memory resource 904 may store instructions that cause the processing resource 902 to perform any process of any block of methods 400, 500, 600, and/or 700, examples of which follow.

Referring to block 906, the non-transitory computer-readable memory resource 904 may store instructions that cause the processing resource 902 to receive a query requesting information regarding relationships. This may be performed substantially as described in block 402 of FIG. 4, block 502 of FIG. 5, and/or block 602 of FIG. 6, and accordingly, the query may have window of time associated with it.

Referring to block 908, the non-transitory computer-readable memory resource 904 may store instructions that cause the processing resource 902 to query a data structure to identify a set of relationships between the first computing entity and the second computing entity during the window of time. This may be performed substantially as described in block 404 of FIG. 4, blocks 504-516 of FIG. 5, and/or block 604 of FIG. 6.

Referring to block 910, the non-transitory computer-readable memory resource 904 may store instructions that cause the processing resource 902 to provide a representation of the first computing entity and the second computing entity as nodes and a representation of a relationship instance of the set of relationship instances as an edge extending between the nodes. This may be performed substantially as described in block 406 of FIG. 4 and/or block 518 of FIG. 5.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
    receiving a query specifying a first computing entity, a second computing entity, and a window of time;
    querying a data structure based on the query to identify a set of relationship instances each corresponding to a relationship between the first computing entity and the second computing entity during the window of time; and
    providing a representation of the first computing entity, the second computing entity, and the set of relationship instances at a user interface;
    wherein the querying of the data structure comprises:
        identifying a start of the window of time in an adjacency list associated with the first computing entity;
        identifying, from the start of the window of time, a first entry in the adjacency list that is within the window of time;
        determining whether the first entry represents a relationship between the first computing entity and the second computing entity; and updating, based on determining that the first entry represents the relationship between the first computing entity and the second computing entity, the set of relationship instances.

2. The method of claim 1, wherein the identifying of the start of the window of time in the adjacency list includes performing a binary search of the adjacency list to identify the start.

3. The method of claim 1, wherein the querying of the data structure includes: following a previous instance pointer from the first entry to a second entry that represents a relationship between the first computing entity and the second computing entity; determining whether the second entry is within the window of time; and based on determining that the second entry is within the window of time, updating the set of relationship instances based on the second entry.

4. The method of claim 1, wherein the query is a first query and the window of time is a first window of time, the method comprising:
receiving a second query specifying a relationship instance of the set of relationship instances and a depth;
identifying a second window of time associated with the second query;
identifying a first set of computing entities having a relationship with an entity selected from a group consisting of: the first computing entity and the second computing entity during the second window of time; and
based on the depth, identifying a second set of computing entities having a relationship with an entity of the first set of computing entities during the second window of time.

5. The method of claim 4,
wherein the data structure includes a neighbor pointer that links an entry in an adjacency list associated with the first computing entity to an entry in an adjacency list associated with a third computing entity, and
wherein the identifying of the second set of computing entities includes identifying the window of time in the adjacency list associated with the third computing entity using the neighbor pointer.

6. The method of claim 1, wherein the relationship includes a communication session.

7. The method of claim 1, wherein the providing of the representation includes providing a time-varying graph representing the first computing entity and the second computing entity as nodes and representing a relationship of the set of relationship instances as an edge.

8. The method of claim 1 comprising selecting an instance of the set of relationship instances to represent a plurality of concurrent relationships based on a skip chain of the data structure.

9. A computing system method comprising:
a relationship data store to store a time-varying data structure;
a query engine communicatively coupled to the relationship data store, wherein the query engine is to:
receive a first query specifying a first computing entity, a second computing entity, and a first window of time;
query the time-varying data structure according to the first query to identify a set of relationship instances between the first computing entity and the second computing entity during the first window of time;
receive a second query specifying a relationship instance of the set of relationship instances, wherein the relationship instance has an associated second window of time; and
query the time-varying data structure according to the second query to identify a first set of computing entities having a relationship with an entity selected from a group consisting of: the first computing entity and the second computing entity during the second window of time;
wherein querying the time-varying data structure according to the first query comprises:
identifying a start of the first window of time in an adjacency list associated with the first computing entity;
identifying, from the start of the first window of time, a first entry in the adjacency list that is within the first window of time;
determining whether the first entry represents a relationship between the first computing entity and the second computing entity; and
updating, based on determining that the first entry represents the relationship between the first computing entity and the second computing entity, the set of relationship instances associated with the first window of time.

10. The computing system of claim 9,
wherein the second query specifies a depth, and
wherein the query engine is to, based on the depth, identify a second set of computing entities having a relationship with an entity of the first set of computing entities.

11. The computing system of claim 10,
wherein the time-varying data structure includes a neighbor pointer that links an entry in an adjacency list associated with the first computing entity to an entry in an adjacency list associated with a third computing entity of the first set of computing entities, and
wherein the query engine is to identify the second window of time in the adjacency list associated with the third computing entity using the neighbor pointer to identify a second set of computing entities.

12. The computing system of claim 9 comprising a user interface communicatively coupled to the query engine, wherein the user interface is to provide a representation of the set of relationship instances and of the first set of computing entities.

13. The computing system of claim 9, wherein the representation represents the first computing entity, the second computing entity, and entities of the first set of computing entities as nodes and relationships therebetween as edges.

14. The computing system of claim 9, wherein a relationship of the set of relationship instances represents a communication session between two computing entities.

15. A non-transitory computer-readable memory resource storing instructions that when executed cause at least one processing resource to:
receive a query for information regarding a relationship between a first computing entity and a second computing entity during a window of time;
query a data structure based on the query to identify a set of relationship instances between the first computing entity and the second computing entity during the window of time; and
provide a representation of the first computing entity and the second computing entity as nodes and a representation of a relationship instance of the set of relationship instances as an edge extending between the nodes;

wherein the instructions that cause the at least one processing resource to query the data structure comprise instructions that cause the at least one processing resource to:

identify a start of the window of time in an adjacency list associated with the first computing entity;

identify, from the start of the window of time, a first entry in the adjacency list that is within the window of time;

determine whether the first entry represents a relationship between the first computing entity and the second computing entity; and update, based on determining that the first entry represents the relationship between the first computing entity and the second computing entity, the set of relationship instances based on the first entry.

16. The non-transitory computer-readable memory resource of claim 15, wherein the query is a first query, the non-transitory computer-readable memory resource storing instructions that when executed cause the at least one processing resource to:

receive a second query specifying the relationship instance of the set of relationship instances and a depth; and identify a first set of computing entities having a relationship with an entity selected from a group consisting of: the first computing entity and the second computing entity; and based on the depth, identify a second set of computing entities having a relationship with an entity of the first set of computing entities.

17. The non-transitory computer-readable memory resource of claim 15, wherein the relationship instance is associated with a communication session between the first computing entity and the second computing entity.

18. The non-transitory computer-readable memory resource of claim 15, wherein the instructions that cause the at least one processing resource to query the data structure include instructions that cause the at least one processing resource to: follow a previous instance pointer from the first entry to a second entry that represents a relationship between the first computing entity and the second computing entity; determine whether the second entry is within the window of time; and based on determining that the second entry is within the window of time, update the set of relationship instances based on the second entry.

\* \* \* \* \*